Patented Dec. 17, 1935

2,025,017

UNITED STATES PATENT OFFICE 2,025,017

PROCESS FOR THE PRODUCTION OF CHLORINATED RUBBER

Eugen Möllney, Ammendorf, Germany, assignor to firm of Chemische Fabrik Buckau, Ammendorf, Germany No Drawing. Application February 10, 1934, Serial No. 710,725. In Germany February 20, 1933

7 Claims. (Cl. 260—1)

This invention relates to a process for the production of chlorinated rubber.

In connection with the employment of chlorinated rubber for various special purposes, the viscosity of the chlorinated rubber solutions required as operative medium is a point of great importance, solutions of high viscosity being necessary for certain purposes, and those of medium or lower viscosity for others. The solubility properties of the chlorinated rubber obtained by known processes are, generally speaking, identical. The viscosity of the resulting solutions was therefore considered to depend solely on the concentration of the chlorinated rubber in solution. Of course, more highly concentrated, and therefore more viscous, solutions can be rendered less viscous by the addition of solvents, but this measure always involves a waste of solvent and, in many instances, the low concentration of the solution is then a source of trouble in use.

Various attempts have therefore been made to produce chlorinated rubber solutions of relatively high concentration but low viscosity. With this object in view, it has been, inter alia, the practice to depolymerize the rubber serving as the originating material, and thereby reduce the viscosity of the solutions employed for chlorination, and consequently that of the chlorinated rubber solutions resulting from such chlorination. In order to reduce the viscosity of the chlorinated rubber solutions, it has been suggested to subject the rubber solution, prior to chlorination, to irradiation, for example with ultra-violet rays, the rubber solutions of relatively low viscosity obtained in this manner being then employed as starting material for the chlorination process. In such event, although the viscosity of the chlorinated rubber solution obtained by chlorination bears a certain relation to the viscosity of the initial rubber solution, all possibility of further influencing the properties of the chlorination product by the aid of this pre-treatment, was however, thereby precluded.

The polymerization process, commencing at the moment the resulting chlorinated rubber molecule is formed, was not arrested, in any way, in this process. Even in starting with a greatly depolymerized, dissolved rubber molecule, reversion to a highly polymerized state takes place during the chlorination process and upon precipitation. Therefore, the pre-treatment of the rubber or rubber solution is of very little value, since the deposited solid chlorinated rubber, which alone is suitable as a commercial product, no longer furnished the desired solutions of low viscosity. In that case, modifying the working temperature and the supply of chlorine could produce no more than insignificant differences in the final product. On again dissolving the deposited chlorinated rubber product obtained under these modified methods of production, for the purpose of practical use, this solution always exhibited the same viscosity, for the same degree of concentration, as in the case of products prepared in the usual way.

The present invention aims at enabling the viscosity of the working solutions to be adjusted, under all manufacturing conditions, in the manner regarded as desirable for the operation to proceed satisfactorily and necessary to ensure the character of the end product, irrespective of the concentration of the initial solutions. Any desired degree of polymerization in the end product can be directly predetermined without modifying any fundamental manufacturing measures. This object is accomplished according to the present invention by the action of light rays, and particularly ultra-violet rays, on the chlorinated rubber molecule both in the already formed and nascent state in the rubber solution during chlorination. This action can be exerted at various stages in the course of manufacture, both during or after the chlorination, and either simultaneously or independently in both said stages.

If the irradiation be employed during the chlorination, that process is substantially accelerated and a perfectly uniform, completely chlorinated product is obtained. In this case also, by controlling the duration or the intensity of the irradiation, an influence can be exerted on the viscosity of the chlorinated solution and therefore also on the degree of polymerization of the end product. The influence of the light is most clearly manifested when the irradiation is applied to the product that has been already formed, but which has not yet been deposited from the solution. For this purpose, the chlorinated rubber solution is preferably placed in a special vessel, of a design that is particularly suitable for the action of the rays.

If, for example, the chlorination product, still in solution, be irradiated by means of a mercury-vapour lamp for a short time, such as 3 to 4 hours, and the deposition of the chlorinated rubber effected after that period, the resulting product will furnish a highly viscous solution with the solvents usually employed for chlorinated rubber. Such solutions are well adapted for the preparation, for instance, of lacquers and other protective coatings possessing high elasticity in addition to a high resistance towards acids, alkalis and other corrosive agents.

By prolonging the irradiation of the solution, to 10 to 12 hours for example, a solid end product is obtained, on deposition, which furnishes solutions of medium viscosity. Such a product is particularly suitable for paints that are desired to be easily "workable" as well as possessing good elasticity.

These substances that furnish solutions of high or medium viscosity are specially adapted for the production of compositions resembling that known under the registered trade-mark "Bakelite".

If the irradiation of the chlorinated solution be prolonged still further, for example to 20 hours and over, the resulting end products give solutions of very low viscosity. These chlorinated rubber products are suitable for the production of lacquers adapted for spraying and may be made of comparatively high concentration.

In the state of their 30% solutions in toluene, the three different kinds of chlorinated rubber described above exhibit the following viscosities (measured by the Wasag method):—

| | Seconds |
|---|---|
| 1. Highly polymerized chlorination product | 300 |
| 2. Product with medium degree of polymerization | 70 |
| 3. Product with low degree of polymerization | 5 |

Any other degree of viscosity can, of course, also be fixed, by controlling the time or intensity of the irradiation or by selectively employing various types of irradiation. The present process therefore affords the possibility of exerting an influence on the degree of polymerization of the final product, and therefore on the viscosity of its solutions.

*Example*

33 kgs. of raw rubber are dissolved in 630 kgs. of carbon tetrachloride, accompanied by irradiation with a mercury-vapour lamp. This solution is then exposed to further irradiation in suitable irradiation vessels, until the viscosity (Wasag) has decreased from 20 minutes to 10 seconds. Chlorine is then introduced into the solution, in a chlorination apparatus, also under irradiation, the chlorination period,—otherwise taking 12 hours and over—being thereby cut down to 8 hours. An additional result is that all portions of the rubber are chlorinated to the limit. Consequently, the solution is perfectly uniform at the end of the chlorination, and does not contain any deposited, incompletely chlorinated portions. Although the viscosity increases slightly during chlorination, it does not do so to the same extent as in chlorination unaccompanied by irradiation. The chlorinated solution is transferred to the irradiation vessels in which it is exposed to the light for 24 hours, the deposition of the rubber chloride then following immediately. In the state of its 30% solution in toluene, this rubber chloride has the Wasag viscosity of 10 seconds.

What I claim is:

1. In the manufacture of chlorinated rubber having a predetermined degree of polymerization, the process which comprises dissolving rubber to make a homogeneous solution, then chlorinating said solution and irradiating the same subsequent to the start of the chlorinating operation for a period sufficient to substantially reduce the viscosity of said solution.

2. In the manufacture of chlorinated rubber having a predetermined degree of polymerization, the process which comprises dissolving rubber in homogeneous solution, then chlorinating said solution and irradiating the same subsequent to the start of the chlorinating operation for a period ranging from about 3 to 32 hours.

3. The process of claim 1 wherein the solution is irradiated during the chlorinating operation.

4. The process of claim 1 wherein the solution is irradiated during and subsequent to the chlorinating operation.

5. The process of claim 1 wherein the solution is irradiated by exposing the same to the action of ultra violet light.

6. In the manufacture of a solid chlorinated rubber having a reduced viscosity when in solution, the process which comprises chlorinating a homogeneous solution of rubber and depositing the chlorinated rubber from solution, the solution being irradiated subsequent to the start of the chlorinating operation and prior to the deposition from solution for a period of at least 4 hours and until a substantial reduction in viscosity is obtained.

7. The process of claim 1 wherein the solution is irradiated subsequent to the chlorinating operation.

EUGEN MÖLLNEY.